March 18, 1924.
C. E. FULLER
CONVEYER
Filed Dec. 20. 1922
1,487,326
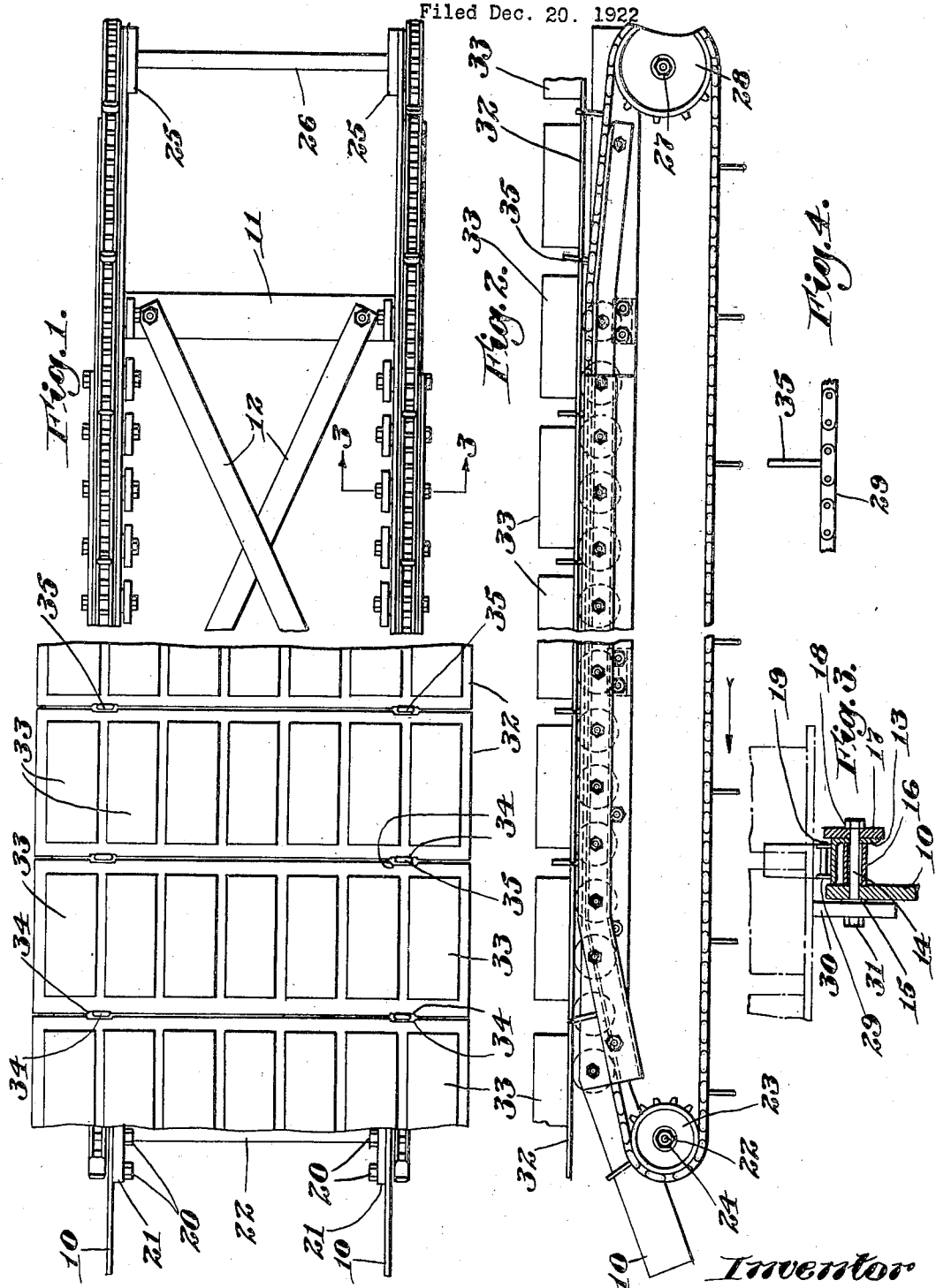
Inventor
Claud E. Fuller
by James R. Hodder
Attorney Patented Mar. 18, 1924.

1,487,326

UNITED STATES PATENT OFFICE.

CLAUD E. FULLER, OF NEW YORK, N. Y.

CONVEYER.

Application filed December 20, 1922. Serial No. 608,058.

*To all whom it may concern:*

Be it known that I, CLAUD E. FULLER, a citizen of the United States, and a resident of New York, in the county and State of New York, have invented an Improvement in Conveyers, of which the following description, in connection with the accompanying drawings, is a specification, like letters on the drawings representing like parts.

My present invention relates to conveyers, and more particularly to a dead roll conveyer adapted for use in a brick hacking machine.

In mechanical handling of brick it is desirable that a dead roll conveyer or antifriction table be positioned at the end of a storage conveyer and in front of a backing apparatus. Such storage conveyer is described and claimed in my copending application, Serial No. 608,057, filed Dec. 22, 1922 and my present invention is adapted to be associated therewith.

In my present invention the pallets engage with the conveyer chains to move the chains and the preceding pallets step by step in a forward direction from the loading to the delivery end thereof. In carrying out my invention I provide a plurality of anti-friction rollers on which the sliding pallets are adapted to roll or slide, such anti-friction rollers maintaining the pallets out of engagement with the surface or runs of the conveyer chains and in which the pallets engage with spaced projections on the conveyer chains to positively move such chains in a forward direction, the speed and distance of each step in the onward travel of the conveyer depending on the speed with which the pallets are delivered to the conveyer and with the width of the pallets. My improved device also properly spaces the pallets and means are also provided for preventing undue endwise movements of the pallets with respect to each other, thus resulting in a device that properly positions a predetermined number of parallelly arranged pallets in alinement with the pushing device.

In the accompanying drawings illustrating a prefered embodiment of my invention, Fig. 1 is a plan view;

Fig. 2 is a side elevation;

Fig. 3 is a sectional end elevation on the line 3—3 of Fig. 1, and

Fig. 4 is a detail of a section of the conveyer chain.

Referring to the drawings, 10 designates side frames, one end of which, the left hand end, forms an angle with the main portion and the side members 10 are spaced apart and tied together by cross members 11 and sway braces 12. Secured to the outside of each of the side plates 10, is an angle iron member 13 which extends lengthwise of each of the side members 10, the outer face of one of the arms of such angle iron member 13 lying in a horizontal plane below the horizontal plane passing through the upper edge of the side plates 10. This angle iron member 13 on each side plate 10 is secured to such side members 10 by a plurality of spaced bolts 14 provided with a shoulder 15 that engages the inner surface of the side members 10, and surrounding the bolts 14 are bushings 16 which are used to maintain the angle iron with the upper outer surface of one arm thereof in a horizontal plane, as clearly shown in Fig. 3. Secured to the angle iron members 13 and side plates 10 are plates 17 which lie parallel with the side plates 10 with the upper edge thereof in substantially the same horizontal plane as lies the upper edge of the side plates 10, a nut 18 securing the plates 17, angle iron members 13, and bushing 16 in position on the side members 10, providing thus a hollow trough 19 for a purpose to be hereinafter described. The ends of both the angle iron members 13 lie at an angle with the main body of the same, forming in this manner an inclined run at each end of the plates 17. Secured to the left hand end of each side plate 10 by bolts 20 are downwardly extending brackets 21 near the lower end of each of which is provided a stub shaft 22 on which is rotatably mounted a sprocket wheel 23, the sprocket wheel being retained in position on the shaft 22 and in association with the side plates 10 by a nut 24. At the other end of the side plates 10 is secured in any suitable manner downwardly extending brackets 25 in which is rotatably mounted a shaft 26 having secured to its ends by nuts 27 sprocket wheels 28, the sprocket wheels 28 being equal in pitch to the sprockets 23, and over the sprockets 23 and 28 run enless sprocket conveyer chains 29, the upper reach of these sprocket chains 29 running in the trough 19 and the shape of the side plates 17 and angle irons 13 make these sprocket chains 29 incline upwardly from the sprocket chains 23 then substantially parallel to the horizontal portion of the side plates 10 and then incline downwardly onto the sprocket 28, the travel of the sprocket chains being indicated by the arrow shown in Fig. 2. The upper reach of the sprocket chains 29 lies in a horizontal plane above, but substantially parallel to, the horizontal plane in which lies the upper edges of the plates 10 and 17.

The bolts 14 extend inwardly, with respect to the side plates 10, and on the inward extension is rotatably mounted anti-friction rollers 30 such rollers being secured to the inward extension of the bolts 14 by nuts 31 and the uppermost portions of each of the anti-friction rollers 30 lie in a horizontal plane that is slightly above, but parallel to, the horizontal plane in which lies the upper surface of the conveyer chains 29, as clearly shown in Fig. 3, this construction enabling the pallets 32, each carrying a plurality of brick 33, to roll over the anti-friction rollers 30 and out of engagement with the conveyer chains 29. Each pallet 32, near the ends and on each edge thereof, is provided with a cut-out portion 34 which, when there are a plurality of pallets on the conveyer, are in alinement with each other on each side. At predetermined points along the length of the conveyer chains 29, the distance between these points being determined by the width of the pallets 32, are provided pins 35 which are adapted to extend upwardly above the pallets 32, and the distance between the chains 29 is such that the pins 35 will come into registry with the cut-out portions 34 so that, as the pallets 32 move to the right, as shown in Fig. 1, the forward cut-out portions 34 of the pallets 32 will engage with the pins 35 on the chains 29 and move the chains forwardly, the chains being adapted to be driven step by step in this manner.

Assuming the device to be constructed and assembled in the manner above described, and assuming, also, that loaded pallets 32, each loaded with a plurality of bricks 33, are delivered onto the conveyer from the left, such pallets will, in their onward movement, engage with, for example, the first pair of upstanding pins 35, the upper ends of which extend above the plane in which lies the top portions of the anti-friction rollers 30, and assuming that a succession of such loaded pallets 32 is being delivered at the end of the machine, the next succeeding pallet will push the first pallet to the right, as viewed in Fig. 1, and the first pallet will, therefore, move the upper reach of the chains 29 to the right because of its engagement with the pins 35 and the next pair of pins, riding up on the upwardly inclined portion of the runway 19, will move upwardly into the space between the alined cut-out portions 34 and this sequence of operations may be continued indefinitely, the conveyer chains 29 being moved forward step by step as the pallets 32 are delivered, the cut-out portions forming a substantially oval opening through which the pins 35 protrude, this pin cooperating with the cut-out portions 34 to not only form a means for forcing the conveyer chains 29 forwardly in unison with the pallets 32, but also preventing undue endwise movement of the pallets with respect to such conveyer chains.

While I have necessarily shown and described the preferred embodiment of my invention somewhat in detail, it is to be understood that I may vary the details of the construction and arrangement of parts within wide limits without departing from the spirit of the invention.

Having thus described my invention, what I claim as new is:

1. In an improved conveyer, the combination of a pair of spaced frame members, a plurality of anti-friction rollers on each side of the frame and the anti-friction rollers on each side being in alinement with each other, a trough secured to the outer side of each of the frame members, an idler endless conveyer chain mounted for sliding movement in said trough and having the upper surface of the idler chain below the upper portions of the anti-friction rollers, article carrier means adapted to roll on said anti-friction rollers and out of engagement with the idler conveyer chains, and means on said idler conveyer chains adapted to be engaged by the article carrier means to move the idler endless conveyer chains forward step by step.

2. An improved conveyer including a frame member, a plurality of anti-friction rollers mounted on the inner face thereof and with their upper edges in alinement and lying in a horizontal plane, a trough secured to the outer side, and extending lengthwise, thereof, an upwardly inclined extension to said trough at the entrance end of the conveyer, a downwardly extending extension to said trough at the delivery end thereof, and an idler endless conveyer having the upper reach thereof slidable in said trough, and means on said idler endless conveyer adapted to engage with, and be driven by, an article to be moved.

In testimony whereof, I have signed my name to this specification.

CLAUD E. FULLER.